US008121340B2

(12) United States Patent
Wei et al.

(10) Patent No.: US 8,121,340 B2
(45) Date of Patent: Feb. 21, 2012

(54) METHOD FOR DECODING AN ENCODED POINT MATRIX IMAGE AND AN ELECTRONIC DEVICE IMPLEMENTING THE SAME

(75) Inventors: Shou-Der Wei, Hsinchu Hsien (TW); Hsin-Chia Chen, Hsinchu Hsien (TW); Tzu-Yi Chao, Hsinchu Hsien (TW)

(73) Assignee: PixArt Imaging Inc., Science-Based Industrial Park, Hsinchu Hsien (TW)

( * ) Notice: Subject to any disclaimer, the term of this patent is extended or adjusted under 35 U.S.C. 154(b) by 1159 days.

(21) Appl. No.: 11/672,142

(22) Filed: Feb. 7, 2007

(65) Prior Publication Data

US 2007/0206029 A1 Sep. 6, 2007

(30) Foreign Application Priority Data

Mar. 6, 2006 (TW) .............................. 95107426 A (51) Int. Cl.
*G06K 9/00* (2006.01)
(52) U.S. Cl. ....................................... 382/100; 235/435
(58) Field of Classification Search .................. 382/100, 382/232–253; 235/435–486
See application file for complete search history.

(56) References Cited

U.S. PATENT DOCUMENTS

| 5,825,947 | A | * | 10/1998 | Sasaki et al. ................. 382/321 |
| 5,866,895 | A | * | 2/1999 | Fukuda et al. ................ 235/494 |
| 5,886,335 | A | * | 3/1999 | Matsueda ..................... 235/436 |
| 5,897,669 | A | * | 4/1999 | Matsui ...................... 235/462.07 |
| 6,052,813 | A | * | 4/2000 | Nagasaki et al. ............. 714/752 |
| 6,173,890 | B1 | * | 1/2001 | Shimizu et al. ............... 235/375 |
| 6,279,830 | B1 | * | 8/2001 | Ishibashi ...................... 235/494 |
| 6,364,209 | B1 | * | 4/2002 | Tatsuta et al. ................. 235/494 |
| 6,548,768 | B1 | * | 4/2003 | Pettersson et al. ......... 178/18.01 |
| 6,560,293 | B1 | * | 5/2003 | Alelyunas et al. ............ 375/261 |
| 6,624,823 | B2 | | 9/2003 | Deering |
| 6,950,519 | B2 | | 9/2005 | Rhoads |
| 7,090,129 | B2 | * | 8/2006 | Tatsuta ......................... 235/435 |
| 7,209,128 | B2 | * | 4/2007 | Shaked et al. ................ 345/176 |
| 7,280,699 | B2 | | 10/2007 | Kojima |
| 7,453,447 | B2 | * | 11/2008 | Marggraff et al. ............ 345/179 |
| 7,502,489 | B2 | | 3/2009 | Rhoads |
| 7,542,607 | B2 | * | 6/2009 | Bartolome .................... 382/187 |
| 7,546,950 | B2 | * | 6/2009 | Thiyagarajah ........... 235/462.09 |
| 7,952,750 | B2 | | 5/2011 | Arakawa |

(Continued)

FOREIGN PATENT DOCUMENTS

CA 2 554 162 A1 8/2005

(Continued)

*Primary Examiner* — Bhavesh M. Mehta
*Assistant Examiner* — Sean Motsinger
(74) *Attorney, Agent, or Firm* — Winston Hsu; Scott Margo (57) ABSTRACT

A method is provided for decoding an encoded point matrix image including a first set of real grid points aligned along a first axis, a second set of real grid points aligned along a second axis intersecting the first axis, and a plurality of encoded data points distributed throughout the encoded point matrix image. The method includes: locating the first and second axes according to a first predetermined principle; finding a set of virtual grid points according to a second predetermined principle, each of the virtual grid points being located at an intersection of a corresponding first virtual line parallel to the first axis and a corresponding second virtual line parallel to the second axis; and decoding each of the encoded data points based on positional relation thereof with a closest one of the virtual grid points so as to obtain information encoded in the encoded point matrix image.

28 Claims, 8 Drawing Sheets

U.S. PATENT DOCUMENTS

| | | |
|---|---|---|
| 2002/0047870 A1 | 4/2002 | Carro |
| 2002/0181792 A1* | 12/2002 | Kojima ......................... 382/239 |
| 2003/0072489 A1* | 4/2003 | Reichenbach et al. ........ 382/181 |
| 2006/0241893 A1* | 10/2006 | Van Thong et al. ........... 702/150 |
| 2007/0019808 A1* | 1/2007 | Gonzalez ........................ 380/51 |
| 2007/0022370 A1* | 1/2007 | Lagardere et al. ............ 715/508 |
| 2007/0164110 A1* | 7/2007 | Yoshida ......................... 235/454 |
| 2008/0013113 A1* | 1/2008 | Gonzalez et al. .............. 358/1.5 |
| 2008/0152224 A1* | 6/2008 | MacKenzie ................... 382/187 |
| 2008/0181447 A1* | 7/2008 | Adams et al. ................. 382/100 |
| 2009/0161957 A1* | 6/2009 | Chan et al. .................... 382/181 |
| 2010/0121737 A1* | 5/2010 | Yoshida ......................... 705/27 |

FOREIGN PATENT DOCUMENTS

| | | |
|---|---|---|
| GB | 2 396 042 A | 6/2004 |
| TW | 528967 | 4/2003 |
| TW | 581970 | 4/2004 |

* cited by examiner

| 1 | 1 | 1 | 1 | 1 | 0 |
|---|---|---|---|---|---|
| 1 | 0 | 0 | 1 | 0 | 0 |
| 1 | 0 | 0 | 0 | 0 | 1 |
| 0 | 0 | 0 | 1 | 0 | 0 |
| 0 | 1 | 0 | 0 | 0 | 0 |
| 0 | 0 | 0 | 1 | 0 | 0 |

METHOD FOR DECODING AN ENCODED POINT MATRIX IMAGE AND AN ELECTRONIC DEVICE IMPLEMENTING THE SAME

CROSS-REFERENCE TO RELATED APPLICATION

This application claims priority of Taiwanese Application No. 095107426, filed on Mar. 6, 2006.

BACKGROUND OF THE INVENTION

1. Field of the Invention

The invention relates to a decoding method and an electronic device implementing the same. In particular, the invention relates to a method for decoding an encoded point matrix image and an electronic device implementing the method.

2. Description of the Related Art

Taiwanese Patent Publication No. 581970, entitled "Electronic Apparatus Utilizing a Graphical Indicator", focuses mainly on constructing graphical indicators on a surface of an object (e.g., a book) in the form of microscopic image points, and obtaining information encoded in the graphical indicators by utilizing a suitable electronic apparatus.

Figure 1:
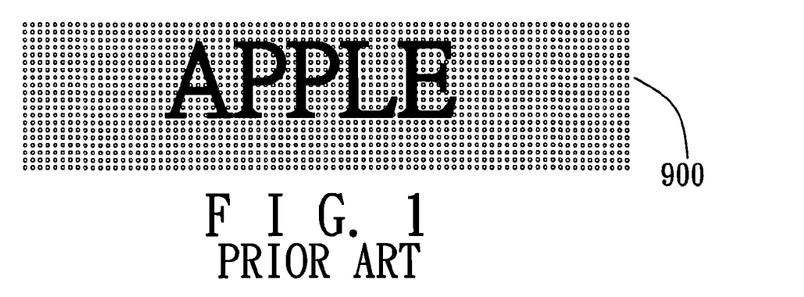
FIG. 1 is a schematic diagram illustrating an example of graphical indicators of the prior art in the form of microscopic image points.

As shown in FIG. 1, the graphical indicators are presented in the form of a combination of microscopic image points 900 that appears to be a background pattern. The combination of microscopic image points 900 is composed of a plurality of the graphical indicators arranged in a particular manner. Since these microscopic image points can be shrunk to an extremely small size, a naked eye can only recognize the letters "APPLE", but not the combination of microscopic image points 900 disposed underneath the letters "APPLE" and hidden as the background. Therefore, the combination of microscopic image points 900 does not interfere with the interpretation of the main information, i.e., the letters "APPLE". In addition, the combination of microscopic image points 900 is encoded with extra information by the graphical indicators.

Figure 2:
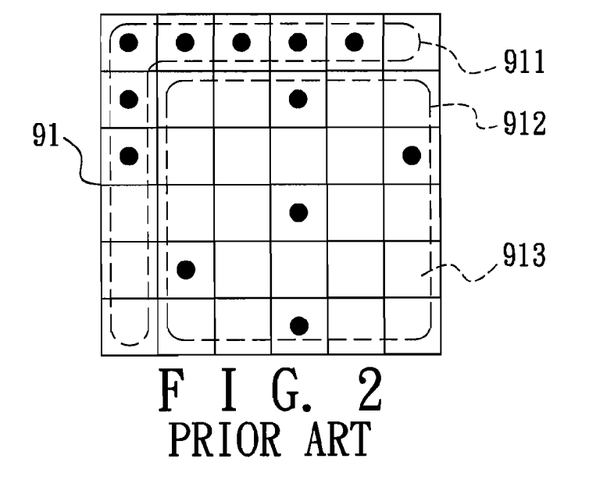
FIG. 2 is an enlarged schematic diagram of one of the graphical indicators of FIG. 1.
Figure 3:
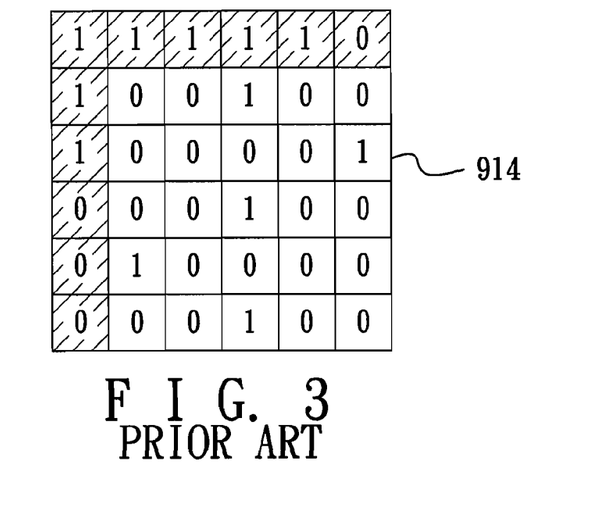
FIG. 3 is a schematic diagram of a bit array decoded from the graphical indicator of FIG. 2.

Shown in FIG. 2 is an enlarged view of one of the graphical indicators 91 in the combination of microscopic image points 900. The graphical indicator 91 includes 6×6 state regions 913, each of which selectively includes a black point or remains blank to represent a first state "1" or a second state "0". The state regions 913 can be decoded and converted into a bit array 914 as illustrated in FIG. 3. Thus, it is only required to put suitable representations in the state regions 913 of the graphical indicator 91 in order for the information to be obtainable when needed in the form of the bit array 914.

Referring back to FIG. 2, the method for acquiring or determining the graphical indicator 91 from the combination of microscopic image points 900 involves sectioning the state regions 913 into a header state region group 911 and a content state region group 912. As long as the header state region groups 911 of all of the graphical indicators 91 are set to be identical, then each of the graphical indicators 91 can be singled out and determined. On the other hand, the content state region group 912 contains the actual information.

However, due to the design nature of the graphical indicator 91, under the circumstance where the graphical indicator 91 to be decoded by the electronic apparatus is fragmented, e.g., the header state region group 911 is incomplete, the graphical indicator 91 cannot be identified, resulting in failure to obtain the information encoded in the content state region group 912 of the graphical indicator 91. Moreover, in order to avoid misidentification of the header state region groups 911, encoding of the content state region group 912 cannot have the same pattern as that of the header state region group 911. Thus, encoding of the content state region group 912 is subject to certain restrictions. In addition, since the graphical indicator 91 uses the presence and absence of black points to represent different encoded information, the number of black points differs as the information varies, resulting in an uneven grayscale pattern, which is easily noticeable by the naked eye.

SUMMARY OF THE INVENTION

Therefore, the object of the present invention is to provide a method for decoding an encoded point matrix image and an electronic device implementing the same that can overcome the aforesaid drawbacks associated with the prior art.

According to one aspect of the present invention, there is provided a method for decoding an encoded point matrix image including a first set of real grid points aligned along a first coordinate axis, a second set of real grid points aligned along a second coordinate axis that intersects the first coordinate axis, and a plurality of encoded data points distributed throughout the encoded point matrix image. The method includes the steps of: (A) locating the first and second coordinate axes according to a first predetermined principle; (B) finding a set of virtual grid points according to a second predetermined principle, each of the virtual grid points being located at an intersection of a corresponding first virtual line parallel to the first coordinate axis and a corresponding second virtual line parallel to the second coordinate axis; and (C) decoding each of the encoded data points based on positional relation thereof with a closest one of the virtual grid points found in step (B) so as to obtain information encoded in the encoded point matrix image.

According to another aspect of the present invention, there is provided an electronic device that includes an image sensor unit, a point detector unit, and a processor unit. The image sensor unit is operable to capture an encoded point matrix image including a first set of real grid points aligned along a first coordinate axis, a second set of real grid points aligned along a second coordinate axis that intersects the first coordinate axis, and a plurality of encoded data points distributed throughout the encoded point matrix image. The point detector unit is coupled to the image sensor unit for evaluating the image captured by the image sensor unit so as to determine spatial orientations and characteristics of the base, real grid and encoded data points. The processor unit is coupled to the point detector unit for receiving information related to the spatial orientations and characteristics of the base, real grid and encoded data points therefrom. The processor unit decodes the encoded data points based on a decoding principle so as to obtain information encoded in the encoded point matrix image. The processor unit locates the first and second coordinate axes according to a first predetermined principle, and finds a set of virtual grid points according to a second predetermined principle. Each of the virtual grid points is located at an intersection of a corresponding first virtual line parallel to the first coordinate axis and a corresponding second virtual line parallel to the second coordinate axis. The processor unit decodes each of the encoded data points based on positional relation thereof with a closest one of the virtual grid points thus found so as to obtain information encoded in the encoded point matrix image.

Since the encoded point matrix image according to the present invention uses the first and second sets of real grid points to define a coordinate plane, misidentification of the header state region group of the prior art is avoided. In addition, the number of encoded data points included in the encoded point matrix image is fixed for all varying encoded information so that it is not visually recognizable that there is encoded information present in the encoded point matrix image.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted herein that like elements are denoted by the same reference numerals throughout the disclosure.

Figure 4:
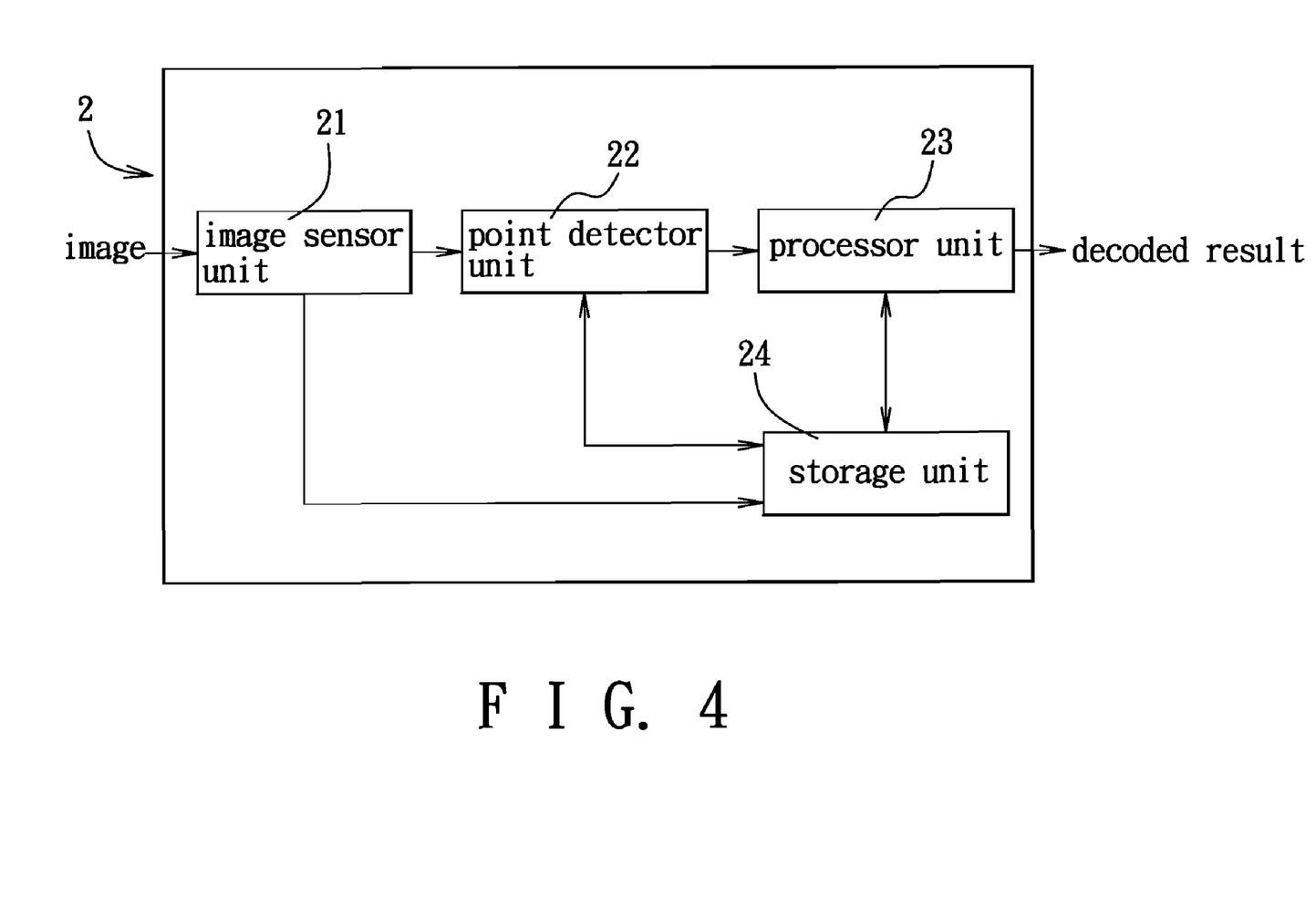
FIG. 4 is a schematic block diagram of an exemplary electronic device implementing the method for decoding an encoded point matrix image according to the present invention.
Figure 5:
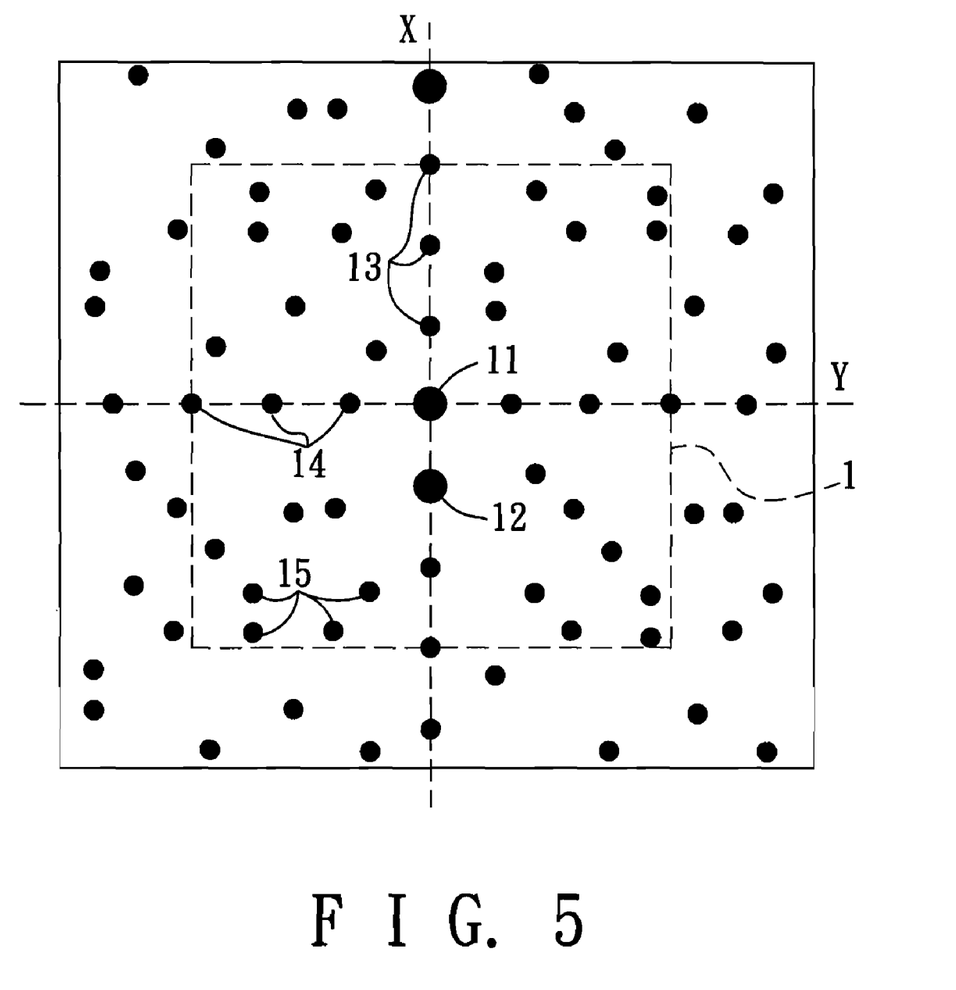
FIG. 5 is a schematic diagram of an encoded point matrix image according to the first preferred embodiment of the present invention.
Figure 9:
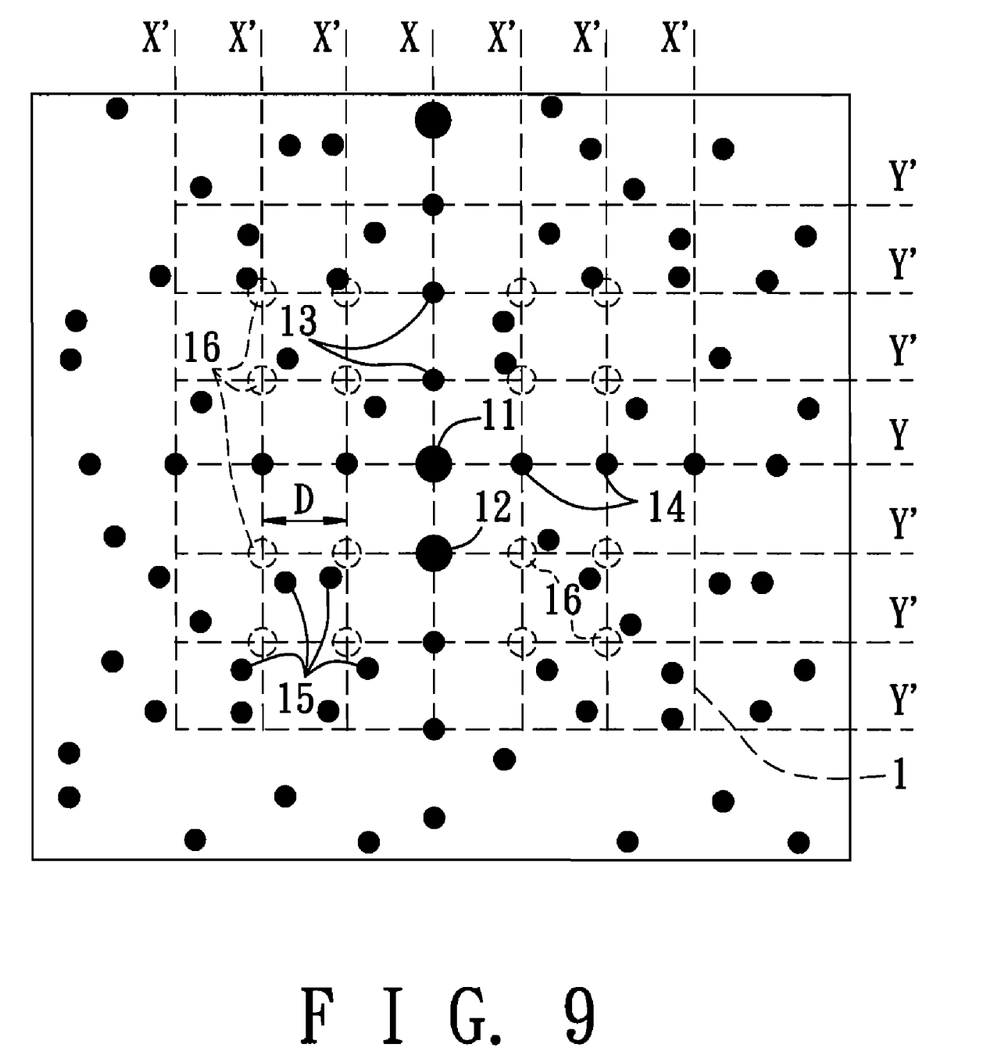
FIG. 9 is a schematic diagram of the encoded point matrix image according to the first preferred embodiment, illustrating a plurality of virtual grid points found by interpolation during the process of decoding the encoded point matrix image.

As shown in FIG. 4, FIG. 5 and FIG. 9, the method for decoding an encoded point matrix image 1 according to the present invention is implemented using an electronic device 2, which obtains and decodes the encoded point matrix image 1. According to the first preferred embodiment of the present invention, the encoded point matrix image 1 includes a base point 11 located at an intersection of a first coordinate axis (X) and a second coordinate axis (Y), a direction indicating point 12 located immediately adjacent to the base point 11 at the first coordinate axis (X), a first set of real grid points 13 aligned along the first coordinate axis (X), a second set of real grid points 14 aligned along the second coordinate axis (Y), and a plurality of encoded data points 15 distributed throughout the encoded point matrix image 1.

The electronic device 2 includes an image sensor unit 21, a point detector unit 22, a processor unit 23, and a storage unit 24. The image sensor unit 21 is operable to capture the encoded point matrix image 1, an example of which is illustrated in FIG. 5. The point detector unit 22 is coupled to the image sensor unit 21 for evaluating the image 1 captured by the image sensor unit 21 so as to determine spatial orientations and characteristics of the base, direction indicating, real grid and encoded data points 11, 12, 13, 14, 15. The storage unit 24 is coupled to the image sensor unit 21 for storing the image 1 captured thereby, and is coupled to the point detector unit 22 for providing the image 1 thereto and for storing information related to the spatial orientations and characteristics of the base, direction indicating, real grid and encoded data points 11, 12, 13, 14, 15 as determined by the point detector unit 22.

The processor unit 23 is coupled to the point detector unit 22 for receiving information related to the spatial orientations and characteristics of the real grid and encoded data points 13, 14, 15 therefrom. The processor unit 23 decodes the encoded data points 15 based on a decoding principle so as to obtain information encoded in the encoded point matrix image 1. The information encoded in the encoded point matrix image 1 as obtained by the processor unit 23 is saved in the storage unit 24 that is coupled to the processor unit 23. The processor unit 23 locates the first and second coordinate axes (X), (Y) according to a first predetermined principle established internally therein, and finds a set of virtual grid points 16 according to a second predetermined principle also established internally therein. Details of the first and second predetermined principles will be described later.

Figure 6:
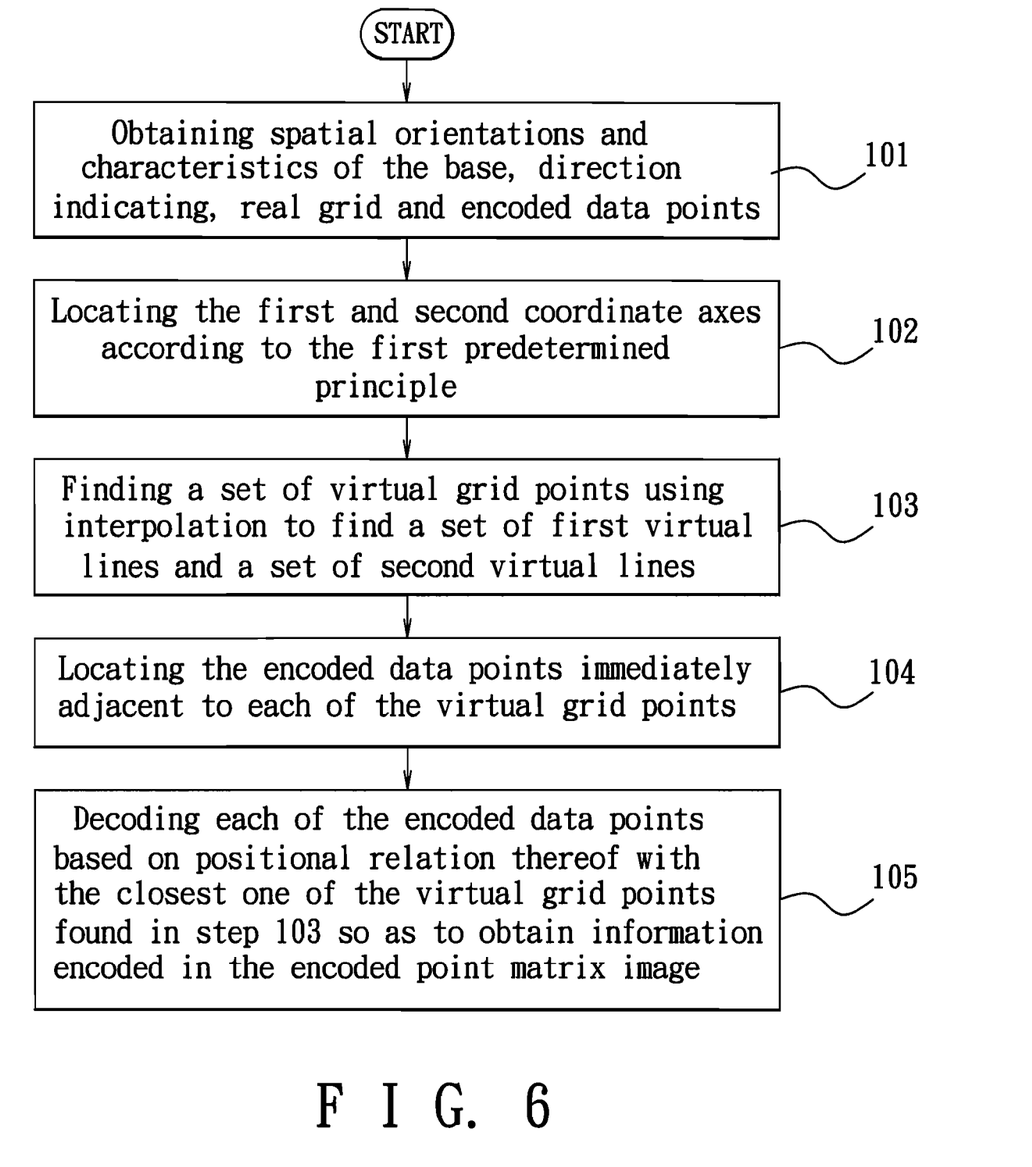
FIG. 6 is a flow chart illustrating the method for decoding the encoded point matrix image according to the present invention.

Provided hereinbelow are detailed descriptions regarding the method for decoding the encoded point matrix image 1 with primary reference to FIG. 4 and FIG. 6, and secondary reference to FIG. 5 and FIGS. 7 to 11. It should be noted that prior to conducting this method, the encoded point matrix image 1 is captured by the image sensor 21.

First, the point detector unit 22 obtains the spatial orientations and characteristics, such as shape, color, pattern, and size, of the base point 11, the direction indicating point 12, the real grid points of the first and second sets 13, 14, and the encoded data points 15 (step 101).

Next, the processor unit 23 locates the first and second coordinate axes (X), (Y) according to the first predetermined principle (step 102). Different ways of implementing the first predetermined principle with respect to the encoded point matrix image 1 according to the first preferred embodiment are explained hereinbelow with reference to FIG. 7 and FIG. 8.

Figure 7:
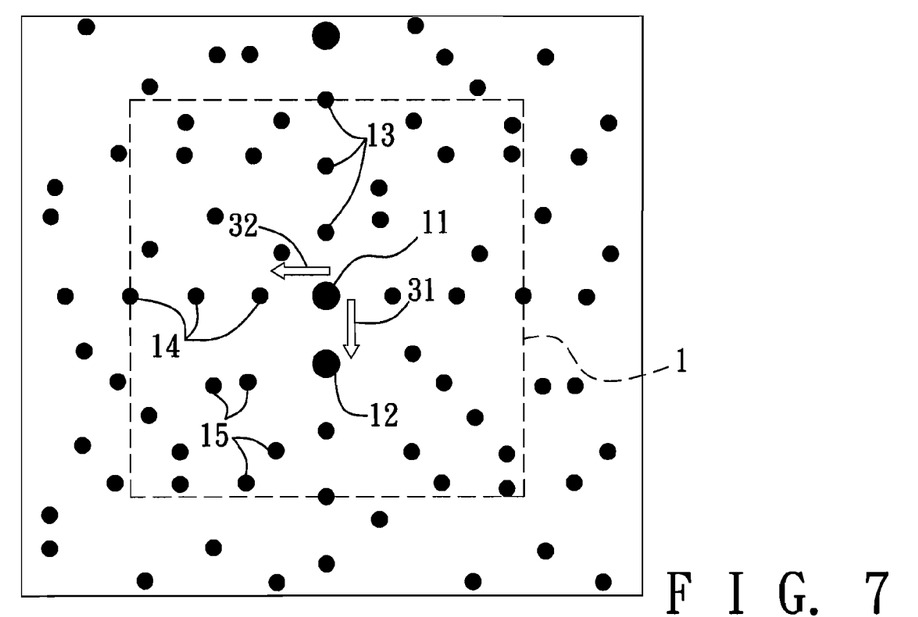
FIG. 7 is a schematic diagram of the encoded point matrix image according to the first preferred embodiment, illustrating first and second ways of implementing a first predetermined principle for locating first and second coordinate axes of the encoded point matrix image.

Referring to FIG. 7, the first predetermined principle can begin with locating one of the first and second coordinate axes (X), (Y) by finding one of the first and second sets of real grid points 13, 14 that are aligned with each other and with the base point 11. Subsequently, the first predetermined principle locates the other one of the first and second coordinate axes (X), (Y) by finding the other one of the first and second sets of real grid points 13, 14 that are aligned with each other and with the base point 11 in a direction forming an angle with said one of the first and second coordinate axes (X), (Y) that was previously found by the processor unit 23. The angle falls within a predetermined range, which is between 90−30 and 90+30 degrees.

The first predetermined principle can also begin by locating the base point 11, which is distinguishable from the real grid points of the first and second sets 13, 14 in at least one of shape, color, pattern, and size. Subsequently, the direction indicating point 12 is located in order to find the first coordinate axis (X), which is defined as a line of alignment (shown by arrow 31) between the base point 11 and the direction indicating point 12. Next, the second coordinate axis (Y) is located in one of two approaches: (A) by defining the second coordinate axis (Y) to be a line forming 90±30 degrees with the first coordinate axis (X) and passing through the base point 11; and (B) by finding the second set of real grid points 14 that are aligned with each other and with the base point 11, and that are misaligned with the direction indicating point 12. Ideally, the first and second coordinate axes (X), (Y) form a 90-degree angle therebetween. However, since the first and second coordinate axes (X), (Y) do not necessarily appear to be perpendicular to each other, especially when the encoded point matrix image 1 is captured by the image sensor 21 at a non-ideal angle, the 90±30 degree angle is taken in the former approach (A). For the sake of brevity, the second coordinate axis (X) is defined to be the line (shown by arrow 32) perpendicular to the first coordinate axis (Y) in this embodiment. It is noted herein that since the alignment between the second set of real grid points 14 is not distorted regardless of the image-capturing angle, the latter approach (B) is also applicable when the encoded point matrix image 1 is captured by the image sensor 21 at a non-ideal angle.

It should be noted herein that the base point 11 is located approximately at the center of the encoded point matrix image 1 so that misidentification due to blurred and indistinct points at the edges of the encoded point matrix image 1 is avoided. In addition, in this embodiment, the difference between the base point 11 and the direction indicating point 12 is that the base point 11 is aligned with the second set of real grid points 14, while the direction indicating point 12 is not.

Figure 8:
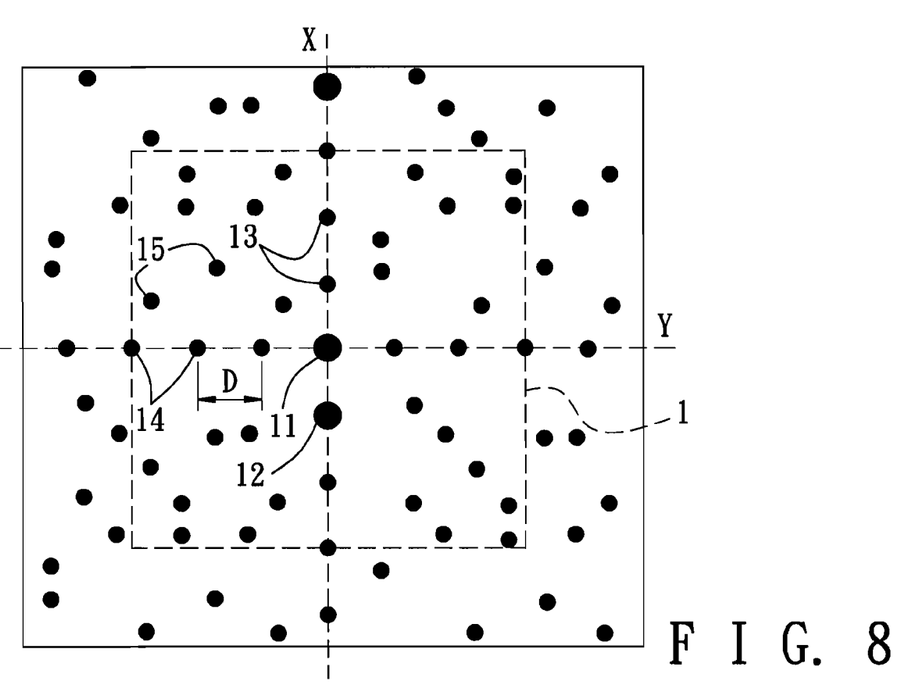
FIG. 8 is a schematic diagram of the encoded point matrix image according to the first preferred embodiment, illustrating a third way of implementing the first predetermined principle.

Referring to FIG. 8 for yet another varying approach, after locating the base point 11, the first predetermined principle can continue to locate one of the first and second coordinate axes (X), (Y) by finding one of the first and second sets of real grid points 13, 14 that are aligned with each other and with the base point 11. Next, a grid distance (D) between each adjacent pair of the real grid points 13 or 14 thus found is determined. Then, the other one of the first and second coordinate axes (X), (Y) is located by finding the other one of the first and second sets of real grid points 13, 14 that are aligned with each other and with the base point 11. Each of the real grid points in the other one of the first and second sets 13, 14 is substantially one grid distance (D) away from an adjacent one of the base point 11 and the real grid points in the other one of the first and second sets 13, 14.

It should be noted herein that in the first embodiment, the direction indicating point 12 is identical in shape, color, pattern, and size with the base point 11, and is only different from the base point 11 in the misalignment/alignment with the second set of real grid points 14. However, the direction indicating point 12 can be different in shape, color, pattern, and size with the base point 11 and the real grid points 13, 14 in other embodiments of the present invention.

Figure 11:
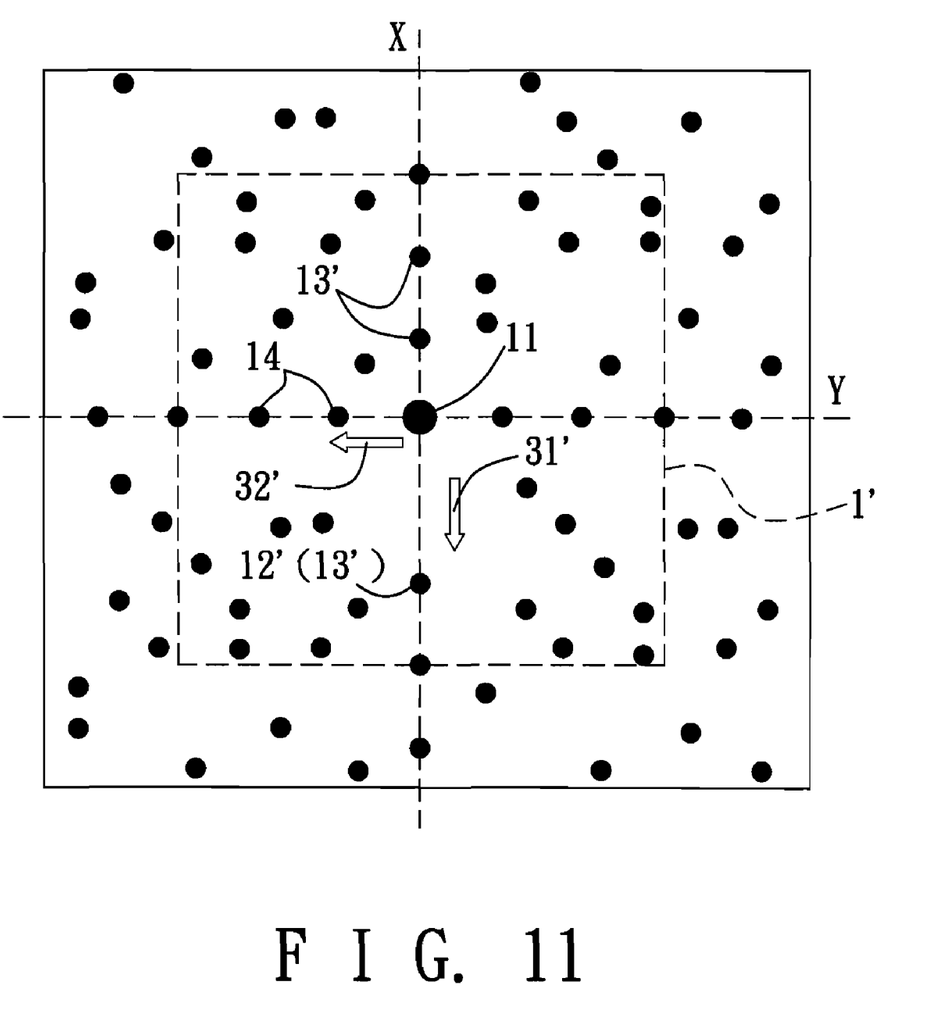
FIG. 11 is a schematic diagram of an encoded point matrix image according to the second preferred embodiment of the present invention, illustrating an approach for implementing the first predetermined principle for locating first and second coordinate axes of the encoded point matrix image.

With reference to FIG. 11, according to the second preferred embodiment of the present invention, the direction indicating point 12' of the encoded point matrix image 1' is identical to the real grid points of the first and second sets 13', 14. To put in simple terms, the second preferred embodiment differs from the first preferred embodiment in that the direction indicating point 12 of the first preferred embodiment is omitted in the second preferred embodiment, and the real grid point of the first set 13' that is two times the grid distance (D) away from the base point 11 is defined as the direction indicating point 12' in the second preferred embodiment.

To comply with this variation, after locating the base point 11, the first predetermined principle of the processor unit 23 continues to locate the second coordinate axis (Y) by finding the second set of real grid points 14 that are aligned with each other and with the base point 11, wherein distances between an adjacent pair of the real grid points in the second set 14 and between the base point 11 and an immediately adjacent one of the real grid points in the second set 14 are substantially equal to each other. In this embodiment, the distance is equal to one grid distance (D). Subsequently, the first coordinate axis (X) is located by finding the direction indicating point 12' and by defining a line of alignment (shown by arrow 31' between the base point 11 and the direction indicating point 12' to be the first coordinate axis (X). In this embodiment, since the direction indicating point 12' is identical in shape, color, pattern, and size with the real grid points of the first set 13', the direction indicating point 12' is found by finding a real grid point in the first set 13' that is immediately adjacent to the base point 11 and that is spaced apart from the base point 11 at a distance that significantly differs from other real grid points 13', 14 immediately adjacent to the base point 11.

Referring back to FIG. 7, FIG. 8 and FIG. 9 with respect to the first preferred embodiment, after the first and second coordinate axes (X), (Y) are located, the method for decoding the encoded point matrix image 1 then finds the set of virtual grid points 16 according to the second predetermined principle (step 103). Each of the virtual grid points 16 is located at an intersection of a corresponding first virtual line (X') parallel to the first coordinate axis (X) and a corresponding second virtual line (Y') parallel to the second coordinate axis (Y).

In this embodiment, the second predetermined principle of the processor unit 23 includes finding the set of virtual grid points 16 using interpolation to find a set of the first virtual lines (X') parallel to the first coordinate axis (X), and a set of the second virtual lines (Y') parallel to the second coordinate axis (Y). Each of the first virtual lines (X') intersects the second coordinate axis (Y) at a corresponding real grid point in the second set of real grid points 14. Each of the second virtual lines (Y') intersects the first coordinate axis (X) at a corresponding real grid point in the first set of real grid points 13. It should be noted herein that the virtual grid points 16 can also be found by computing the vector between the base point 11 and each of the real grid points in both the first and second sets 13, 14 in other embodiments of the present invention.

The method for decoding the encoded point matrix image 1 then continues to locate the encoded data points 15 immediately adjacent to the virtual grid points 16 (step 104).

Figure 10:
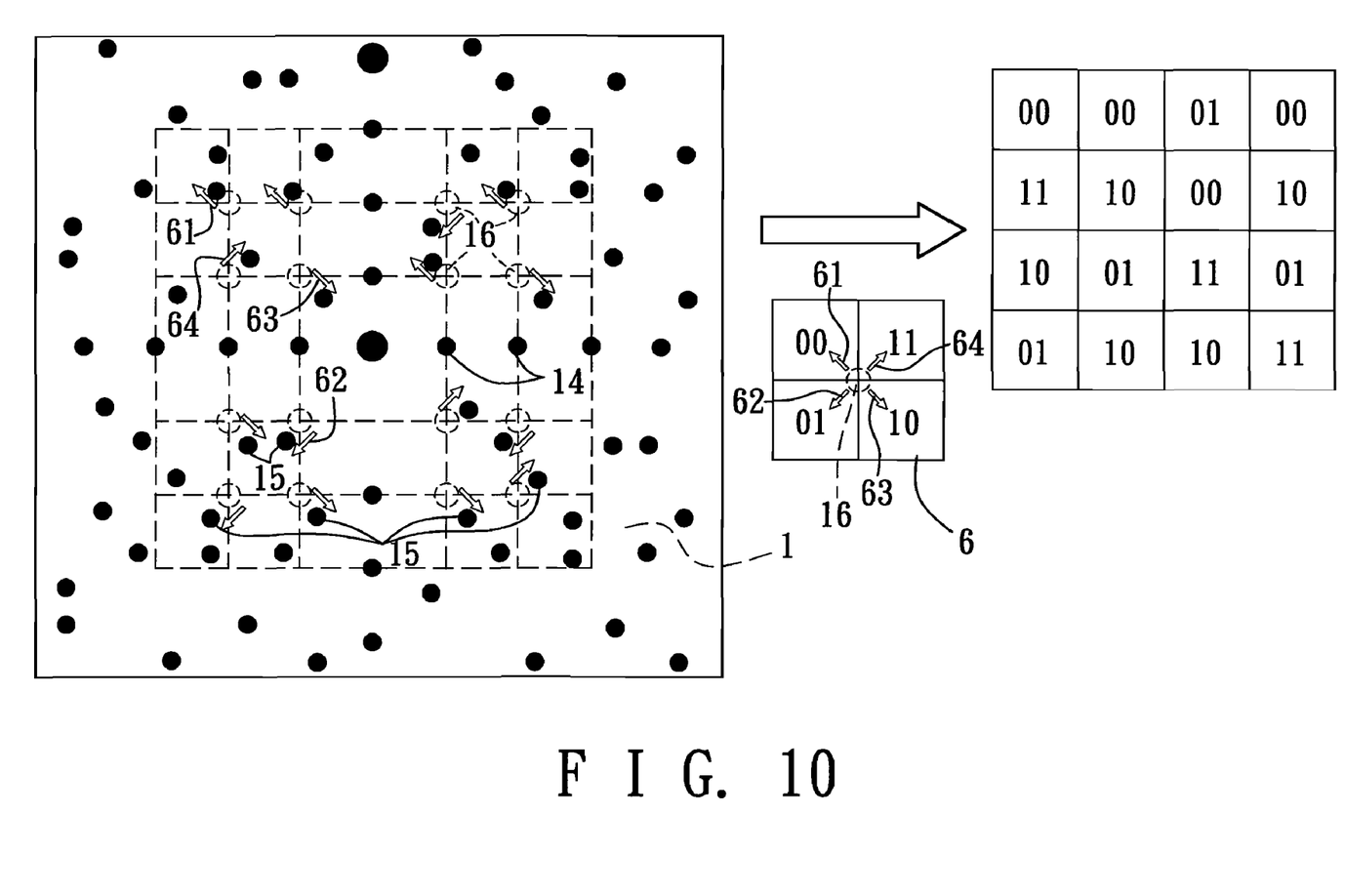
FIG. 10 is a schematic diagram of the encoded point matrix image according to the first preferred embodiment, illustrating decoding of encoded data points based on positional relation with the virtual grid points.

With reference to FIG. 4 and FIG. 10, each of the encoded data points 15 is then decoded based on positional relation thereof with a closest one of the virtual grid points 16 found in step 103 so as to obtain information encoded in the encoded point matrix image 1 (step 105). The decoding principle is defined according to one of directional relation, relative distance, and relative angular distance of the encoded data point 13 with respect to the closest one of the virtual grid points 16 found by the processor unit 23 so as to obtain information encoded in the encoded point matrix image 1.

In this embodiment, the decoding principle is defined according to the directional relation of the encoded data point 13 with respect to the closest one of the virtual grid points 16. In particular, each one of the virtual grid points 16 is taken as a coordinate center for defining four quadrants. The encoded data point 15 falling within each of the four quadrants as defined by the closest one of the virtual grid points 16, i.e., having one of four directional relations with the virtual grid point 16, has a corresponding decoded value. Referring to a decoding table 6 shown in FIG. 10, directional relations 61, 62, 63, 64, each falling within a different quadrant, respectively correspond to decoded values "00", "01", "10", and "11". Preferably, the relation between directional relation and decoded value can be defined in a look-up table stored in the storage unit 24.

Therefore, through utilizing the point detector unit 22 to evaluate the encoded point matrix image 1 (1') captured by the image sensor unit 21 so as to determine the spatial orientations and characteristics of the base, direction indicating, real grid and encoded data points 11, 12 (12'), 13 (13'), 14, 15, and through utilizing the processor unit 23 to decode the encoded data points 15 based on the decoding principle, the information encoded in the encoded point matrix image 1 (1') can be obtained.

In sum, the method for decoding an encoded point matrix image and an electronic device implementing the same have the following advantages:

(1) In the prior art, an intact graphical indicator 91 (shown in FIG. 2) provided with a complete head state region group 911 is required when obtaining the information encoded in the graphical indicator 91. In addition, the encoding of the content state region group 912 is subject to certain restrictions since the encoding of the content state region group 912 cannot have the same pattern as that of the header state region group 911 so as to avoid misidentification of the header state region group 911. Unlike the prior art, the method for decoding the encoded point matrix image 1 (1') according to the present invention is capable of obtaining the encoded information regardless of any rotation or out of plane capture angle when the encoded point matrix image 1 (1') is captured by the image sensor 21, or if a fragmented captured image 1 (1') is provided for decoding. Therefore, the present invention has higher tolerance with respect to distortion, and has higher identification and decoding capabilities as compared to the prior art.

(2) The encoded data points 15 can only be decoded after the virtual grid points 16 are found using interpolation such that information contained in the encoded point matrix image 1 (1') is not readily recognizable.

(3) Each state region 913 (shown in FIG. 2) in the prior art only has two different states (including a black point or remaining blank) such that it can only store one bit of information. On the other hand, since each of the encoded data points 15 in the encoded point matrix image 1 (1') of the present invention is decoded based on the positional relation of the encoded data points 15, such as directional relation, relative distance, and relative angular distance, with the closest one of the virtual grid points 16, the encoded data point 15 can have multiple states such that it can represent at least two bits of information. Therefore, the present invention greatly increases the amount of information that can be represented by an encoded data point 15.

(4) Since the encoding in the prior art is represented using the presence and absence of the black points, distribution of the black points shown in the graphical indicator 91 is uneven, resulting in a grayscale pattern that is easily detectable by the naked eye. On the contrary, since the encoding in the encoded point matrix image 1 (1') of the present invention is represented using a positional offset of the encoded data points 15 with respect to the virtual grid points 16, the total number of points in the encoded point matrix image 1 (1') is fixed, and the encoded point matrix image 1 (1') is therefore not easily noticeable by the naked eye.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A method for decoding an encoded point matrix image including a first set of real grid points aligned along a first coordinate axis, a second set of real grid points aligned along a second coordinate axis that intersects the first coordinate axis, and a plurality of encoded data points distributed throughout the encoded point matrix image, the method comprising the steps of:
   (A) locating the first and second coordinate axes according to a first predetermined principle;
   (B) finding a set of virtual grid points according to a second predetermined principle, each of the virtual grid points being located at an intersection of a corresponding first virtual line parallel to the first coordinate axis and a corresponding second virtual line parallel to the second coordinate axis; and
   (C) decoding each of the encoded data points based on positional relation thereof with a closest one of the virtual grid points found in step (B) so as to obtain information encoded in the encoded point matrix image;
   wherein the first predetermined principle in step (A) of the method includes:
   (A-1) locating the base point;
   (A-2) locating one of the first and second coordinate axes by finding one of the first and second sets of real grid points that are aligned with each other and with the base point; and
   (A-3) locating the other one of the first and second coordinate axes by finding the other one of the first and second sets of real grid points that are aligned with each other and with the base point in a direction forming an angle with said one of the first and second coordinate axes found in sub-step (A-2), the angle falling within a predetermined range.

2. The method as claimed in claim 1, wherein, in sub-step (A-1), the base point is distinguishable from the real grid points in at least one of shape, color, pattern, and size.

3. The method as claimed in claim 1, wherein the second predetermined principle in step (B) of the method includes finding a set of virtual grid points using interpolation to find a set of the first virtual lines parallel to the first coordinate axis, and a set of the second virtual lines parallel to the second coordinate axis, each of the first virtual lines intersecting the second coordinate axis at a corresponding real grid point in the second set of real grid points, each of the second virtual lines intersecting the first coordinate axis at a corresponding real grid point in the first set of real grid points.

4. An electronic device comprising:
   an image sensor unit operable to capture an encoded point matrix image including a first set of real grid points aligned along a first coordinate axis, a second set of real grid points aligned along a second coordinate axis that intersects the first coordinate axis, and a plurality of encoded data points distributed throughout the encoded point matrix image;
   a point detector unit coupled to said image sensor unit for evaluating the image captured by said image sensor unit so as to determine spatial orientations and characteristics of the real grid and encoded data points; and a processor unit coupled to said point detector unit for receiving information related to the spatial orientations and characteristics of the real grid and encoded data points therefrom, said processor unit decoding the encoded data points based on a decoding principle so as to obtain information encoded in the encoded point matrix image;

wherein said processor unit locates the first and second coordinate axes according to a first predetermined principle, and finds a set of virtual grid points according to a second predetermined principle, each of the virtual grid points being located at an intersection of a corresponding first virtual line parallel to the first coordinate axis and a corresponding second virtual line parallel to the second coordinate axis;

wherein said processor unit decodes each of the encoded data points based on positional relation thereof with a closest one of the virtual grid points thus found so as to obtain information encoded in the encoded point matrix image;

wherein the encoded point matrix image further includes a base point located at an intersection of the first and second coordinate axes; and wherein the first predetermined principle of said processor unit includes locating the base point; locating one of the first and second coordinate axes by finding one of the first and second sets of real grid points that are aligned with each other and with the base point, and locating the other one of the first and second coordinate axes by finding the other one of the first and second sets of real grid points that are aligned with each other and with the base point in a direction forming an angle with said one of the first and second coordinate axes that was previously found by said processor unit, the angle falling within a predetermined range.

5. The electronic device as claimed in claim 4, wherein the decoding principle is defined according to one of directional relation, relative distance, and relative angular distance of the encoded data point with respect to the closest one of the virtual grid points found by said processor unit so as to obtain the information encoded in the encoded point matrix image.

6. The electronic device as claimed in claim 4, wherein the base point is distinguishable from the real grid points in at least one of shape, color, pattern, and size.

7. The electronic device as claimed in claim 4, wherein the second predetermined principle of said processor unit includes finding the set of virtual grid points using interpolation to find a set of the first virtual lines parallel to the first coordinate axis, and a set of the second virtual lines parallel to the second coordinate axis, each of the first virtual lines intersecting the second coordinate axis at a corresponding real grid point in the second set of real grid points, each of the second virtual lines intersecting the first coordinate axis at a corresponding real grid point in the first set of real grid points.

8. A method for decoding an encoded point matrix image including a first set of real grid points aligned along a first coordinate axis, a second set of real grid points aligned along a second coordinate axis that intersects the first coordinate axis, and a plurality of encoded data points distributed throughout the encoded point matrix image, the method comprising the steps of:

(A) locating the first and second coordinate axes according to a first predetermined principle;

(B) finding a set of virtual grid points according to a second predetermined principle, each of the virtual grid points being located at an intersection of a corresponding first virtual line parallel to the first coordinate axis and a corresponding second virtual line parallel to the second coordinate axis; and (C) decoding each of the encoded data points based on positional relation thereof with a closest one of the virtual grid points found in step (B) so as to obtain information encoded in the encoded point matrix image;

wherein the encoded point matrix image further includes a base point located at an intersection of the first and second coordinate axes; and wherein the first predetermined principle in step (A) of the method includes:

(A-1) locating the base point;

(A-2) locating one of the first and second coordinate axes by finding one of the first and second sets of real grid points that are aligned with each other and with the base point;

(A-3) determining a grid distance between each adjacent pair of the real grid points found in sub-step (A-2); and (A-4) locating the other one of the first and second coordinate axes by finding the other one of the first and second sets of real grid points that are aligned with each other and with the base point, each of the real grid points in the other one of the first and second sets being substantially one grid distance away from an adjacent one of the base point and the real grid points in the other one of the first and second sets.

9. The method as claimed in claim 8, wherein, in sub-step (A-1), the base point is distinguishable from the real grid points in at least one of shape, color, pattern, and size.

10. The method as claimed in claim 9, wherein the second predetermined principle in step (B) of the method includes finding a set of virtual grid points using interpolation to find a set of the first virtual lines parallel to the first coordinate axis, and a set of the second virtual lines parallel to the second coordinate axis, each of the first virtual lines intersecting the second coordinate axis at a corresponding real grid point in the second set of real grid points, each of the second virtual lines intersecting the first coordinate axis at a corresponding real grid point in the first set of real grid points.

11. An electronic device comprising:

an image sensor unit operable to capture an encoded point matrix image including a first set of real grid points aligned along a first coordinate axis, a second set of real grid points aligned along a second coordinate axis that intersects the first coordinate axis, and a plurality of encoded data points distributed throughout the encoded point matrix image;

a point detector unit coupled to said image sensor unit for evaluating the image captured by said image sensor unit so as to determine spatial orientations and characteristics of the real grid and encoded data points; and a processor unit coupled to said point detector unit for receiving information related to the spatial orientations and characteristics of the real grid and encoded data points therefrom, said processor unit decoding the encoded data points based on a decoding principle so as to obtain information encoded in the encoded point matrix image;

wherein said processor unit locates the first and second coordinate axes according to a first predetermined principle, and finds a set of virtual grid points according to a second predetermined principle, each of the virtual grid points being located at an intersection of a corresponding first virtual line parallel to the first coordinate axis and a corresponding second virtual line parallel to the second coordinate axis; and wherein said processor unit decodes each of the encoded data points based on positional relation thereof with a closest one of the virtual grid points thus found so as to obtain information encoded in the encoded point matrix image;

wherein the encoded point matrix image further includes a base point located at an intersection of the first and second coordinate axes; and wherein the first predetermined principle of said processor unit includes locating the base point, locating one of the first and second coordinate axes by finding one of the first and second sets of real grid points that are aligned with each other and with the base point, determining a grid distance between each adjacent pair of the real grid points thus found, and locating the other one of the first and second coordinate axes by finding the other one of the first and second sets of real grid points that are aligned with each other and with the base point, each of the real grid points in the other one of the first and second sets being substantially one grid distance away from an adjacent one of the base point and the real grid points in the other one of the first and second sets.

12. The electronic device as claimed in claim 11, wherein the base point is distinguishable from the real grid points in at least one of shape, color, pattern, and size.

13. The electronic device as claimed in claim 11, wherein the decoding principle is defined according to one of directional relation, relative distance, and relative angular distance of the encoded data point with respect to the closest one of the virtual grid points found by said processor unit so as to obtain the information encoded in the encoded point matrix image.

14. The electronic device as claimed in claim 11, wherein the second predetermined principle of said processor unit includes finding the set of virtual grid points using interpolation to find a set of the first virtual lines parallel to the first coordinate axis, and a set of the second virtual lines parallel to the second coordinate axis, each of the first virtual lines intersecting the second coordinate axis at a corresponding real grid point in the second set of real grid points, each of the second virtual lines intersecting the first coordinate axis at a corresponding real grid point in the first set of real grid points.

15. A method for decoding an encoded point matrix image including a first set of real grid points aligned along a first coordinate axis, a second set of real grid points aligned along a second coordinate axis that intersects the first coordinate axis, and a plurality of encoded data points distributed throughout the encoded point matrix image, the method comprising the steps of:

(A) locating the first and second coordinate axes according to a first predetermined principle;

(B) finding a set of virtual grid points according to a second predetermined principle, each of the virtual grid points being located at an intersection of a corresponding first virtual line parallel to the first coordinate axis and a corresponding second virtual line parallel to the second coordinate axis; and (C) decoding each of the encoded data points based on positional relation thereof with a closest one of the virtual grid points found in step (B) so as to obtain information encoded in the encoded point matrix image;

wherein the encoded point matrix image further includes a base point located at an intersection of the first and second coordinate axes, and a direction indicating point located immediately adjacent to the base point at the first coordinate axis; and wherein the first predetermined principle in step (A) of the method includes:

(A-1) locating the base point;
(A-2) locating the direction indicating point to find the first coordinate axis; and
(A-3) locating the second coordinate axis by finding the second set of real grid points that are aligned with each other and with the base point, and that are misaligned with the direction indicating point.

16. The method as claimed in claim 15, wherein in sub-step (A-1), the base point and the direction indicating point are distinguishable from the real grid points and from each other in at least one of shape, color, pattern, and size.

17. The method as claimed in claim 15, wherein the second predetermined principle in step (B) of the method includes finding a set of virtual grid points using interpolation to find a set of the first virtual lines parallel to the first coordinate axis, and a set of the second virtual lines parallel to the second coordinate axis, each of the first virtual lines intersecting the second coordinate axis at a corresponding real grid point in the second set of real grid points, each of the second virtual lines intersecting the first coordinate axis at a corresponding real grid point in the first set of real grid points.

18. An electronic device comprising:

an image sensor unit operable to capture an encoded point matrix image including a first set of real grid points aligned along a first coordinate axis, a second set of real grid points aligned along a second coordinate axis that intersects the first coordinate axis, and a plurality of encoded data points distributed throughout the encoded point matrix image;

a point detector unit coupled to said image sensor unit for evaluating the image captured by said image sensor unit so as to determine spatial orientations and characteristics of the real grid and encoded data points; and a processor unit coupled to said point detector unit for receiving information related to the spatial orientations and characteristics of the real grid and encoded data points therefrom, said processor unit decoding the encoded data points based on a decoding principle so as to obtain information encoded in the encoded point matrix image;

wherein said processor unit locates the first and second coordinate axes according to a first predetermined principle, and finds a set of virtual grid points according to a second predetermined principle, each of the virtual grid points being located at an intersection of a corresponding first virtual line parallel to the first coordinate axis and a corresponding second virtual line parallel to the second coordinate axis; and wherein said processor unit decodes each of the encoded data points based on positional relation thereof with a closest one of the virtual grid points thus found so as to obtain information encoded in the encoded point matrix image;

wherein the encoded point matrix image further includes a base point located at an intersection of the first and second coordinate axes, and a direction indicating point located immediately adjacent to the base point at the first coordinate axis; and wherein the first predetermined principle of said processor unit includes locating the base point, locating the direction indicating point to find the first coordinate axis, and locating the second coordinate axis by finding the second set of real grid points that are aligned with each other and with the base point, and that are misaligned with the direction indicating point.

19. The electronic device as claimed in claim 18, wherein the base point and the direction indicating point are distinguishable from the real grid points and from each other in at least one of shape, color, pattern, and size.

20. The electronic device as claimed in claim 18, wherein the decoding principle is defined according to one of directional relation, relative distance, and relative angular distance of the encoded data point with respect to the closest one of the virtual grid points found by said processor unit so as to obtain the information encoded in the encoded point matrix image.

21. The electronic device as claimed in claim 18, wherein the second predetermined principle of said processor unit includes finding the set of virtual grid points using interpolation to find a set of the first virtual lines parallel to the first coordinate axis, and a set of the second virtual lines parallel to the second coordinate axis, each of the first virtual lines intersecting the second coordinate axis at a corresponding real grid point in the second set of real grid points, each of the second virtual lines intersecting the first coordinate axis at a corresponding real grid point in the first set of real grid points.

22. A method for decoding an encoded point matrix image including a first set of real grid points aligned along a first coordinate axis, a second set of real grid points aligned along a second coordinate axis that intersects the first coordinate axis, and a plurality of encoded data points distributed throughout the encoded point matrix image, the method comprising the steps of:
(A) locating the first and second coordinate axes according to a first predetermined principle;
(B) finding a set of virtual grid points according to a second predetermined principle, each of the virtual grid points being located at an intersection of a corresponding first virtual line parallel to the first coordinate axis and a corresponding second virtual line parallel to the second coordinate axis; and
(C) decoding each of the encoded data points based on positional relation thereof with a closest one of the virtual grid points found in step (B) so as to obtain information encoded in the encoded point matrix image;
wherein the encoded point matrix image further includes a base point located at an intersection of the first and second coordinate axes; and
wherein the first predetermined principle in step (A) of the method includes:
(A-1) locating the base point;
(A-2) locating the first coordinate axis by finding the first set of real grid points that are aligned with each other and with the base point, distances between an adjacent pair of the real grid points in the first set and between the base point and an immediately adjacent one of the real grid points in the first set being substantially equal to each other; and
(A-3) locating the second coordinate axis by finding a real grid point in the second set that is immediately adjacent to the base point and that is spaced apart from the base point at a distance that significantly differs from other real grid points immediately adjacent to the base point, and by defining a line of alignment between the base point and the real grid point thus found in sub-step (A-3) to be the second coordinate axis.

23. The method as claimed in claim 22, wherein, in sub-step (A-1), the base point is distinguishable from the real grid points in at least one of shape, color, pattern, and size.

24. The method as claimed in claim 22, wherein the second predetermined principle in step (B) of the method includes finding a set of virtual grid points using interpolation to find a set of the first virtual lines parallel to the first coordinate axis, and a set of the second virtual lines parallel to the second coordinate axis, each of the first virtual lines intersecting the second coordinate axis at a corresponding real grid point in the second set of real grid points, each of the second virtual lines intersecting the first coordinate axis at a corresponding real grid point in the first set of real grid points.

25. An electronic device comprising:
an image sensor unit operable to capture an encoded point matrix image including a first set of real grid points aligned along a first coordinate axis, a second set of real grid points aligned along a second coordinate axis that intersects the first coordinate axis, and a plurality of encoded data points distributed throughout the encoded point matrix image;
a point detector unit coupled to said image sensor unit for evaluating the image captured by said image sensor unit so as to determine spatial orientations and characteristics of the real grid and encoded data points; and
a processor unit coupled to said point detector unit for receiving information related to the spatial orientations and characteristics of the real grid and encoded data points therefrom, said processor unit decoding the encoded data points based on a decoding principle so as to obtain information encoded in the encoded point matrix image;
wherein said processor unit locates the first and second coordinate axes according to a first predetermined principle, and finds a set of virtual grid points according to a second predetermined principle, each of the virtual grid points being located at an intersection of a corresponding first virtual line parallel to the first coordinate axis and a corresponding second virtual line parallel to the second coordinate axis;
wherein said processor unit decodes each of the encoded data points based on positional relation thereof with a closest one of the virtual grid points thus found so as to obtain information encoded in the encoded point matrix image;
wherein the encoded point matrix image further includes a base point located at an intersection of the first and second coordinate axes; and
wherein the first predetermined principle of said processor unit includes locating the base point, locating the first coordinate axis by finding the first set of real grid points that are aligned with each other and with the base point, distances between an adjacent pair of the real grid points in the first set and between the base point and an immediately adjacent one of the real grid points in the first set being substantially equal to each other, and locating the second coordinate axis by finding a real grid point in the second set that is immediately adjacent to the base point and that is spaced apart from the base point at a distance that significantly differs from other real grid points immediately adjacent to the base point, and by defining a line of alignment between the base point and the real grid point in the second set thus found to be the second coordinate axis.

26. The electronic device as claimed in claim 25, wherein the base point is distinguishable from the real grid points in at least one of shape, color, pattern, and size.

27. The electronic device as claimed in claim 25, wherein the decoding principle is defined according to one of directional relation, relative distance, and relative angular distance of the encoded data point with respect to the closest one of the virtual grid points found by said processor unit so as to obtain the information encoded in the encoded point matrix image.

28. The electronic device as claimed in claim 25, wherein the second predetermined principle of said processor unit includes finding the set of virtual grid points using interpolation to find a set of the first virtual lines parallel to the first coordinate axis, and a set of the second virtual lines parallel to the second coordinate axis, each of the first virtual lines intersecting the second coordinate axis at a corresponding real grid point in the second set of real grid points, each of the second virtual lines intersecting the first coordinate axis at a corresponding real grid point in the first set of real grid points.

* * * * *